US009701100B2

(12) United States Patent
Al Jishi et al.

(10) Patent No.: US 9,701,100 B2
(45) Date of Patent: Jul. 11, 2017

(54) LIGHTWEIGHT REINFORCED PHENOLIC STRUCTURAL SANDWICH PANEL BASED ON ARAMID HONEYCOMB CORE AND METHOD

(71) Applicant: BFG International, Manama (BH)

(72) Inventors: Samer Al Jishi, Manama (BH); Anjal Motwani, Manama (BH); Vivek Govindaraj, Manama (BH)

(73) Assignee: BFG INTERNATIONAL, Manama (BH)

( * ) Notice: Subject to any disclaimer, the term of this patent is extended or adjusted under 35 U.S.C. 154(b) by 447 days.

(21) Appl. No.: 14/315,188

(22) Filed: Jun. 25, 2014

(65) Prior Publication Data
US 2015/0041057 A1    Feb. 12, 2015

Related U.S. Application Data

(60) Provisional application No. 61/846,747, filed on Jul. 16, 2013.

(51) Int. Cl.
*B32B 37/10*    (2006.01)
*B32B 3/12*    (2006.01)
(Continued)

(52) U.S. Cl.
CPC ........ *B32B 37/1018* (2013.01); *B29C 66/112* (2013.01); *B29C 66/114* (2013.01); *B29C 66/5346* (2013.01); *B29C 66/71* (2013.01); *B29C 66/723* (2013.01); *B29C 66/7254* (2013.01); *B29C 66/73752* (2013.01); *B29C 66/81455* (2013.01); *B32B 3/12* (2013.01); *B32B 5/024* (2013.01); *B32B 5/24* (2013.01);
(Continued)

(58) Field of Classification Search
None
See application file for complete search history.

(56) References Cited

U.S. PATENT DOCUMENTS 2,682,491 A * 6/1954 Hahn ............... B32B 15/08
156/197
3,351,760 A * 11/1967 Brown ............... G01N 23/00
250/302
(Continued)

FOREIGN PATENT DOCUMENTS

EP    0624462 A1    11/1994

OTHER PUBLICATIONS netcomposites information brochure, "Honeycomb Cores", http://www.netcomposites.com/guide/core-materials/46, 2013.

*Primary Examiner* — Jeff Aftergut
*Assistant Examiner* — Jaeyun Lee
(74) *Attorney, Agent, or Firm* — patenttm.us

(57) ABSTRACT

A structural panel comprises phenolic skins formed over a honeycomb core. The skins are bonded to the honeycomb under vacuum and heat, providing a panel capable of forming to desired shapes. The panel is 30% lighter than aluminum honeycomb panels of similar thickness, equivalent in strength to aluminum honeycomb panels, and meets the very stringent fire, smoke and toxicity norms of the industry. Additionally the product also reduces the thermal load, has very high heat resistance and is corrosion resistant. The use of this product is not limited to flat profiles, but can also be used to mold double curved or other three dimensional profiles.

19 Claims, 2 Drawing Sheets

(51) Int. Cl.

| | | |
|---|---|---|
| *B32B 27/42* | (2006.01) | |
| *B32B 5/24* | (2006.01) | |
| *B29C 65/00* | (2006.01) | |
| *B32B 5/26* | (2006.01) | |
| *B32B 29/02* | (2006.01) | |
| *B32B 37/14* | (2006.01) | |
| *C09J 161/06* | (2006.01) | |
| *B32B 5/02* | (2006.01) | |
| *B32B 7/12* | (2006.01) | |
| *B32B 27/12* | (2006.01) | |
| *B32B 27/18* | (2006.01) | |
| *B29C 65/48* | (2006.01) | |
| *B29L 31/60* | (2006.01) | |
| *B32B 37/12* | (2006.01) | |
| *B32B 38/00* | (2006.01) | |

(52) U.S. Cl.
CPC .............. *B32B 5/26* (2013.01); *B32B 7/12* (2013.01); *B32B 27/12* (2013.01); *B32B 27/18* (2013.01); *B32B 27/42* (2013.01); *B32B 29/02* (2013.01); *B32B 37/146* (2013.01); *C09J 161/06* (2013.01); *B29C 65/483* (2013.01); *B29C 66/53462* (2013.01); *B29C 66/7212* (2013.01); *B29C 66/7352* (2013.01); *B29C 66/919* (2013.01); *B29C 66/949* (2013.01); *B29L 2031/608* (2013.01); *B32B 37/12* (2013.01); *B32B 2038/0076* (2013.01); *B32B 2260/046* (2013.01); *B32B 2262/0269* (2013.01); *B32B 2262/101* (2013.01); *B32B 2305/18* (2013.01); *B32B 2307/306* (2013.01); *B32B 2307/3065* (2013.01); *B32B 2307/714* (2013.01); *B32B 2307/72* (2013.01); *B32B 2307/734* (2013.01); *B32B 2309/12* (2013.01); *B32B 2439/00* (2013.01); *B32B 2439/40* (2013.01); *B32B 2605/00* (2013.01); *B32B 2607/00* (2013.01)

(56) References Cited

U.S. PATENT DOCUMENTS

| | | | |
|---|---|---|---|
| 4,112,164 A * | 9/1978 | Koss | B29C 70/00 |
| | | | 181/286 |
| 4,445,956 A * | 5/1984 | Freeman | B23Q 3/086 |
| | | | 156/154 |
| 4,735,841 A | 4/1988 | Sourdet | |
| 6,511,730 B1 * | 1/2003 | Blair | B32B 3/12 |
| | | | 428/116 |
| 2003/0114064 A1 | 6/2003 | Fu et al. | |
| 2006/0046019 A1 * | 3/2006 | Wang | B32B 3/12 |
| | | | 428/73 |

\* cited by examiner

LIGHTWEIGHT REINFORCED PHENOLIC STRUCTURAL SANDWICH PANEL BASED ON ARAMID HONEYCOMB CORE AND METHOD

CROSS-REFERENCE TO RELATED APPLICATIONS

This application claims benefit of U.S. Provisional Patent Application Ser. No. 61/846,747 filed Jul. 16, 2013, entitled LIGHTWEIGHT REINFORCED PHENOLIC STRUCTURAL SANDWICH PANEL BASED ON ARAMID HONEYCOMB CORE AND METHOD.

BACKGROUND

This disclosure relates to structural panels, for example wall panels used in construction of rolling stock or other vehicles.

Wall panels used in the construction of, for example, rolling stock, train cars, airplanes and the like, need to be rigid, light weight and fire resistant. Current practice in the rolling stock industry is to use aluminum honeycomb panels as construction panels. As the rail industry moves to faster trains it also needs lighter products to achieve this target, hence the industry has opted to use aluminum honeycomb panel, wherever light weight nearly flat paneling is needed, such as external paneling.

Aluminum honeycomb panels have some further disadvantages in that the shapes to which they can be formed are limited and if the panel is impacted, the aluminum skin & core can permanently dent or deform resulting in a dented appearance. Also being a metal, it has lower corrosion resistance and is a conductor of heat, which are undesirable properties for this kind of application.

SUMMARY

The present disclosure relates to a processing method, to produce panels with phenolic skins & core, more effectively and securely.

In accordance with the disclosure, an alternative material is offered, which is about 30% lighter, equivalent in strength to aluminum honeycomb panels, and meets the very stringent fire, smoke and toxicity (safety) norms of industry. Additionally the product also reduces the thermal load, has very high heat resistance and is corrosion resistant. The use of this product is not limited to flat profiles, but can also be used to mould double curved or other three dimensional profiles.

Accordingly, the present disclosure provides an improved structural panel for use in industrial applications.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises a structural panel comprising a honeycomb core with glass reinforced phenolic skin and method of producing the same.

Figure 1:
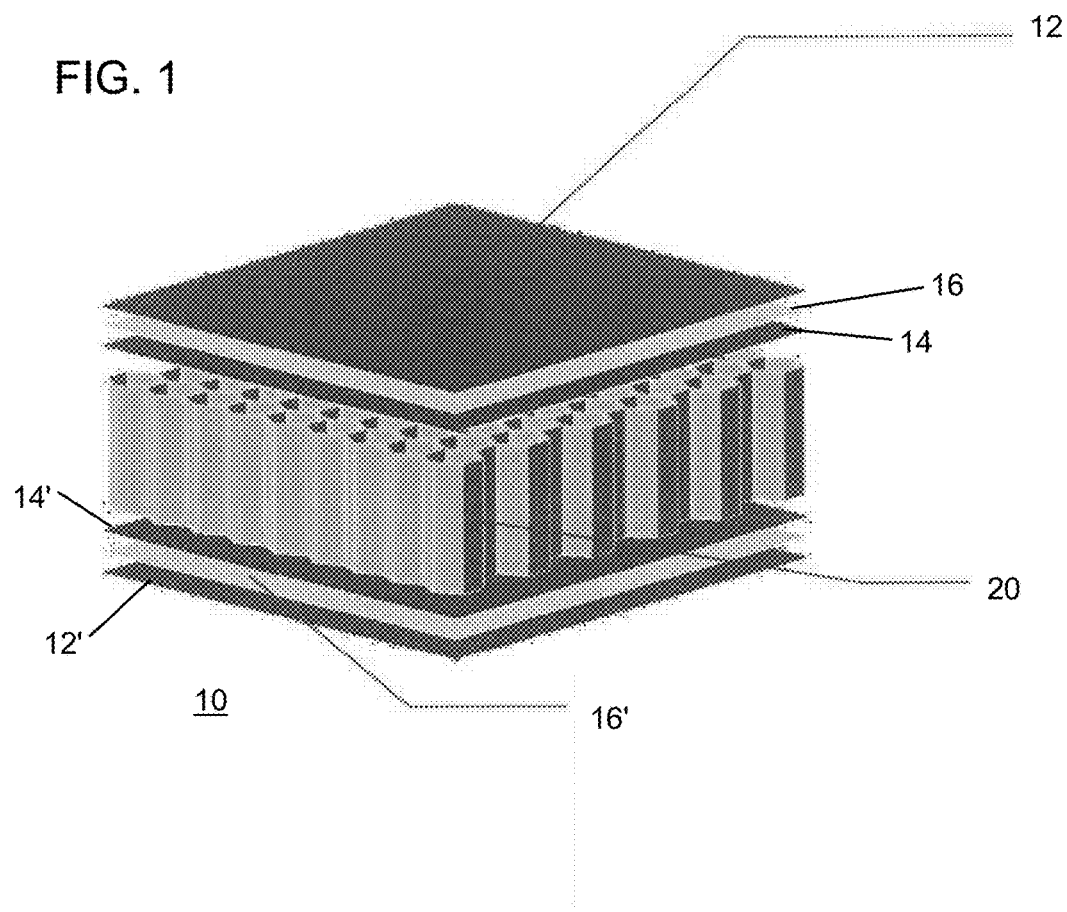
FIG. 1 is an exploded perspective view of a portion of an exemplary panel.

Referring to FIG. 1, an exploded perspective view of a portion of an exemplary panel 10, the construction of this panel is typically glass reinforced phenolic skin layers comprising two fabric layers 12, 14 bonded via use of bonding medium 16, comprising a phenolic adhesive, to an aramid honeycomb core 20. When assembled, the layers 12, 14 and bonding medium 16 form a layer 18, typically 0.5 to 2 mm in thickness. The honeycomb core has uniform cell size of 5-15 mm. The bonding medium is an in-house formulated glue using Catalyzed liquid phenolic resin mixed with a pyrogenic oxide such as fumed silica and other additives, in the range of 0.2% to 10%. This gives the product its thixotropy, low moisture absorption and optimizes its rheological properties. The phenolic skin layers use glass fibers to provide strength and the resin of the phenolic skin provides excellent fire resistance and low smoke and toxicity benefits. This bonding medium has the same chemistry as the resin in the skin layers, and therefore assists in mechanical and chemical bonding between the skins and the core, curing to exhibit similar properties to the phenolic skins.

Current established methods for manufacturing of similar panels are typically done using prepegs as layers 12, 14 with an optional adhesive film between the core and the prepeg which assists in bonding. The product in accordance with the present disclosure uses a liquid phenolic resin to impregnate the selected glass fibre and specially formulated adhesive in the intermediate layers for the bonding.

This process is thereof modified to accommodate glass reinforced fibre skins impregnated with liquid phenolic resin.

The skins construction can be varied to include stitched, woven or Aramid based/E glass fibre to enhance the properties as needed.

Use of light weight, strong and easily impregnated fibres for layers 12, 14 with a certain structure/weave and density of, for example between 30-500 gms/square meter, ensures that the adhesive is retained in the upper skin during application and does not totally seep down to fill the honeycomb cells and increase the weight. Also, since the adhesive is applied in between two layers, this restricts the downward flow of the adhesive, yet allows penetration of the adhesive through the layers in limited amounts towards the core under the effect of vacuum as discussed below.

Figure 3:
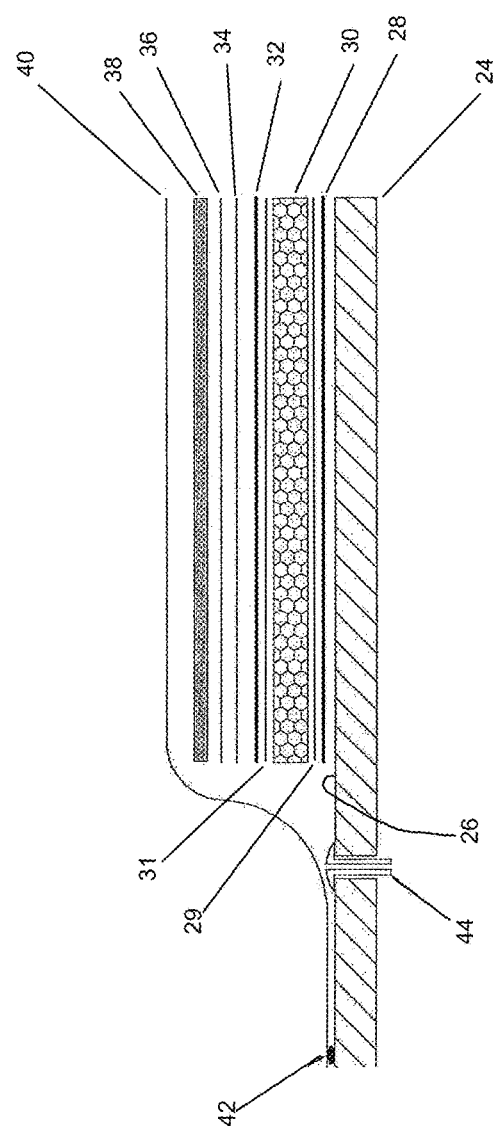
FIG. 3 is a diagram showing a production method.

The entire composite panel is then subject to vacuum and high temperature using negative pressure by the process of vacuum bagging. With reference to FIG. 3, a diagram showing a production method, a mould 24 is provided which has a face 26 with a desired finished 3 dimensional configuration, whether flat or contoured to form the panel to a desired shape. A bottom skin 28 (which as noted previously may comprise a glassfibre composed of two fabric layers 12', 14' and a bonding medium 16' therebetween) is placed against the mould face 26 and a honeycomb core 30 is then positioned on top of the bottom skin. Top skin 32 (which as noted previously may comprise a glassfibre composed of two fabric layers 12, 14 and a bonding medium 16 therebetween) is set on the top face of the honeycomb core, followed by a peel ply 34, release film 36 and bleeder fabric 38. Optionally, a thin layer of adhesive coating 29 and 31 may be applied between the skins and the honeycomb core.

The entire sandwiched assembly is then placed within a vacuum bag 40 which is sealed to the mould by use of seal 42. A vacuum connector 44 is provided in the mould to allow connection to a vacuum source, which draws the vacuum bag down to compress the various layers together.

The bonding of individual layers is then achieved by exposing the uncured laminate to high temperature while under vacuum. This methodology ensures that the core plus skins develop a mechanical and chemical bonding. Other established processes use high positive pressure for bonding instead of a negative pressure (vacuum) used in the product and process of the current disclosure.

The panel is cured completely at temperatures ranging from 60-120 Deg Celsius for 1-8 hours under vacuum, before being taken for the further processing. This produces a product which is very light, has high stiffness and good peel strength in addition to excellent fire smoke and toxicity requirements.

The honeycomb core being phenolic based, forms a chemical bond with the skins due to fusing of similar materials used on the skins. A mechanical fixation is ensured by 'fillet formation' at the edge of the honeycomb cells. The specially formulated adhesive has a combination of surface tension, surface wetting and controlled flow during the early stages of cure which enable the formation of the fillets.

The density and type of the glass used as adjacent skin layers to the core are unique and the fabric assists in the bonding of the skins to the core as it offers the right permeability for the glue to flow through and form localized fillets with the core and improves the peel strength.

As a standard industry practice, formation of panels is accomplished with the glue applied immediately between the core and the skin. In contrast, since the product and process of the current disclosure, glue is applied in between two fabric layers, the adhesive is trapped, yet able to penetrate toward the core side as required under vacuum. This prevents the glue from falling into the hollow honeycomb cells and collecting on the lower face, due to gravity. This promotes equal adhesive application on each side, which is more desirable, as unequal glue on either face, leads to an imbalance, improper bonding and lower peel strength on the upper moulded face.

The bonding of individual layers, achieved by exposing the uncured laminate to high temperature and negative pressure provided by the vacuum ensures that the core and skins develop a mechanical and chemical bonding.

Use of the applicants' bonding methodology reduces the amount of bonding medium that is needed for proper bonding, so therefore reduces weight.

Since the core and bonding medium are co-cured along with the skins the resulting product is dimensionally stable and evenly bonded.

Figure 2:
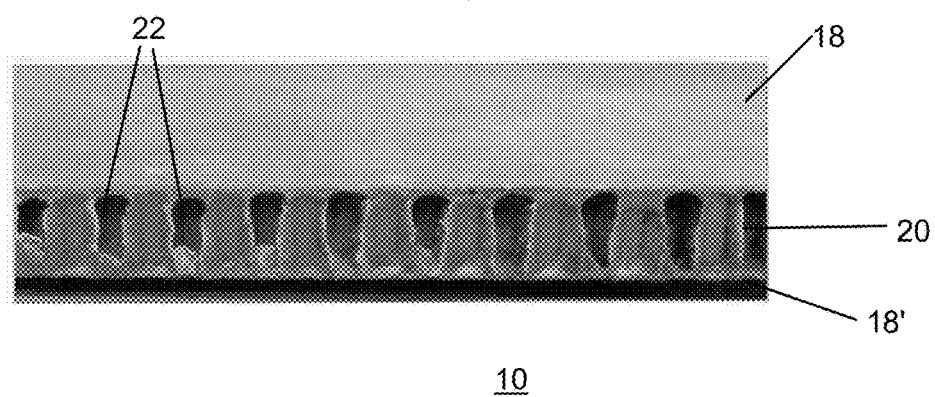
FIG. 2 is a cross sectional view of a completed panel.

FIG. 2 is a cross sectional view of a panel after processing. The core, being phenolic based, forms a molecular bond with the layers, and mechanical fastening is ensured by fillets 22 formed at the edge of the honeycomb cells.

Table 1 illustrates some properties of an exemplary panel produced in accordance with the disclosure herein.

TABLE 1

| 10 mm thickness | STD/SPECIFICATIONS | Present product |
| --- | --- | --- |
| Weight kgs/m2 | Lightweight | 3.2-3.4 kgs/m2 |
| Peel Torque (avg) | ASTM D 1781 | 24 lbs - in/3 in (Load - 215 N/3 in) |
| Flexural Properties | ASTM C 393 Span ratio of 2:1 - length:width | |

TABLE 1-continued

| 10 mm thickness | STD/SPECIFICATIONS | Present product |
| --- | --- | --- |
| Max load | | 300 N |
| Facing Bending Stress | | 48-50 MPA |
| Core shear Stress - due to flexion | | 0.6 MPa |
| Flat wise tensile strength | ASTM C297 | 0.8 MPa (failure mode: core sheared, bonding between facings & core intact |
| Flat wise compression strength | ASTM C365 | 2.2 MPa |
| Maximum deflection under load | Distributed vertical load - applied at 600 kgs/m2 | Elastic deformation - 6.8 mm max; No permanent deformation |
| Maximum deflection under load applied continuously for 48 hrs | Vertical distributed load - applied at 160 kgs/m2 | Elastic deformation - 0.7 mm max; No permanent deformation |
| Fire specification | | |
| German | DIN 5510 | S4/SR2/ST2 |
| German/European | EN ISO 5659 (as per DIN 5510 - 2009) | FED at 30 min = 0.07 |
| EU | EN 45545 | HL2 for Interiors |
| French | NFF 16101 | M1 F1 |
| British | BS 6853 | Category 1A |
| American | ASTM E 162 ASTM E 662 | FSI < 10 Ds (1.5) < 100; Ds (4) < 200 |
| Impact resistance | As per EN 438-2/22 When ball is dropped from a ht of 1 m. | No crack, impression of 11 mm Φ; <0.2 mm in depth |
| Water absorption | 90 hrs continuous immersion | <2.5% |
| Performance after Aging: (Thermal & humidity cyclic test) | EN ISO 9142 Cycle D3 - for 30 days | No debonding or failure of construction. |
| Vibration test | EN 61373 (04/2011) § 10 | No debonding or failure of tested panel. |

Case Study

An external panel for a toilet cabin (e.g. for use in a train) was moulded and assembled by replacing an existing aluminum honeycomb panel. Table 2 illustrates the comparison with the prior aluminum honeycomb panel.

TABLE 2

| | Al HC existing panel | Current disclosure | Remarks |
| --- | --- | --- | --- |
| Panel weight (as assembled) | 18.4 kgs | 13.8 kgs | 25% lighter |
| Straightness | 1.55 mm across span length | 2 mm across span length | Dimensionally equivalent |
| Deflection at 100 kgf in the middle of a wall over a span length | <5 mm | <5 mm | Equivalent in performance |

TABLE 2-continued

|  | Al HC existing panel | Current disclosure | Remarks |
|---|---|---|---|
| of 2000 mm Assembly interfaces | Standard | Exactly the same as aluminum honeycomb panel | No change in fastening techniques |
| Curved geometry | Radiuses lager than 40 mm only possible | Easy to mould, radius as small as 3 mm possible | Not possible to bend AL HC to tight radiuses. Bends on larger radiuses are at risk of deforming |

Table 3 shows some exemplary variations of panels constructed in accordance with the present disclosure.

TABLE 3

| SPECIALTY (10 +/− 1.5 mm thickness) | Standard | Panel 1 | Panel 2 | Panel 3 | Panel 4 |
|---|---|---|---|---|---|
| Weight kgs/m2 | | 3.2-3.5 kgs | 3.8-4 kgs | 5-5.2 kgs | 3.3-3.6 kgs |
| Skin thickness | | 0.35-0.45 mm | 0.5-0.6 mm | 0.8-0.9 mm | 0.35-0.45 mm |
| Peel strength/ peel torque | ASTM D 178 | | 24 lbs - in/3 in (Load 215 N/3 in | | |
| Flexural Properties | ASTM C 393 | | | | |
| Max load | | 300 N | 340 N | 460 N | 390 N |
| Facing Bending stress | | 45-48 MPa | 36 MPa | 27 MPa | 53 MPa |
| Core shear stress due to flexion | | | 0.55-0.64 MPa | | 0.72 MPa |
| Flat wise tensile strength | ASTM C 365 | 0.8 MPa | 0.8 MPa | 1.1 MPa | 0.88 MPa |
| Flat wise compressive strength | ASTM C 365 | 2.2 MPa | 3 MPa | 3 MPa | 4.4 MPa |
| Maximum deflection and deformation under load | Vertical distributed load applied at 600 kgs/m2 | Elastic deformation - 6.8 mm max; No permanent deformation | Elastic deformation - 5.2 mm max; No permanent deformation | Elastic deformation - 3.2 mm max; No permanent deformation | Elastic deformation - 6.8 mm max; No permanent deformation |
| Impact resistance | EN 438-2/22; from a height of 1 meter | No crack, impression of 11 mm; <0.2 mm in depth | No crack, impression of 6 mm; <0.2 mm in depth | No crack, impression of 5 mm; <0.2 mm in depth | No crack, impression of 10 mm; <0.2 mm in depth |

Accordingly a panel is provided that is 30% lighter than aluminum honeycomb panels of similar thickness. The panel is formed of two rigid, thin, high strength facings over a thick low density core, with an adhesive attachment which forces the core and facings to act as a continuous structure. The panel has a peel strength, which is a measure of the bonding strength between the core and skin, that is equivalent to aluminum honeycomb panels and which also meets the minimum values set for use in aircraft sandwich panels. No permanent deformation occurs on application of load, due to the elastic nature of the material. Excellent fire performance is provided, meeting the highest level of safety base on standards set across all countries. The panel is extremely lightweight, has excellent stiffness, high strength to weight ration and provides excellent fire resistance, being non combustible and non toxic. The panel is corrosion resistant, has excellent dielectric properties, is thermally insulating and has good thermal stability and acoustic performance. The panels are high temperature resistant being an insulating medium, unlike aluminum which is conductive of heat. High pressure laminates bond well to the phenolic skins on the present panels since they are made of similar materials, and the thermal elongation properties are similar, reducing the risk of debonding when exposed to cyclic cooling and heating. Aluminum in contrast expands/contracts differently from the high pressure laminates, which can cause debonded pockets during the life of a panel. The honeycomb cell size of the current panel is, for example, 5 mm, compared to 12 mm used in aluminum honeycomb. The smaller cell size increases the contact area for bonding and provides better load transfer. Further, cell size in aluminum honeycomb can be non-uniform, as the core is sourced in unexpanded form and is expanded before processing. The non-uniform cell size can cause internal stresses and lead to debonding when the panel is subject to bending forces. The panels in accordance with the present disclosure can be formed to complex acute and oblique curves as well as flat geometries. The panels can be easily repaired, where localized repair is possible using standard glass fibre reinforced panel techniques. In contrast, aluminum panels would dent permanently and could not be brought back into shape.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A method of producing a structural panel, comprising:
   providing a phenolic honeycomb core;
   providing first and second phenolic face layers on opposites sides of the honeycomb core, wherein one of said first and second phenolic face layers comprises a first fabric layer and a second fabric layer, said first and second fabric layers comprising a weave and density of between 30 and 500 grams per square meter; impregnating said first and second fabric layers with a liquid phenolic adhesive by providing said liquid phenolic adhesive between said first and second fabric layers; and curing said core and face layers under vacuum and raised temperature, wherein said curing is carried out at a temperature between 60-120 degrees Celsius.

2. The method according to claim 1, further comprising providing a further bonding medium for securing said first and second face layers to said honeycomb core.

3. The method according to claim 1, wherein at least one of said first and second phenolic face layers comprises glass fibers.

4. The method according to claim 1, wherein said curing is performed for between for 1-8 hours.

5. The method according to claim 1, wherein said liquid phenolic adhesive comprises a catalyzed liquid phenolic resin mixed with a pyrogenic oxide plus suitable additives.

6. The method according to claim 1, wherein said liquid phenolic adhesive comprises a catalyzed liquid phenolic resin mixed with a pyrogenic oxide comprising fumed silica.

7. The method according to claim 1, wherein said liquid phenolic adhesive comprises a catalyzed liquid phenolic resin mixed with a pyrogenic oxide comprising fumed silica in the range of 0.2 to 10%.

8. The method according to claim 1, wherein said honeycomb core comprises an aramid based honeycomb.

9. The method according to claim 1, wherein said honeycomb core comprises a uniform cell size of between 5 and 15 mm.

10. The method according to claim 1, wherein one of said first and second face layers is between 0.5 and 2.0 mm in thickness.

11. The method according to claim 1, wherein said curing under vacuum comprises vacuum bagging said phenolic honeycomb core and said first and second phenolic face layers.

12. A method of producing a structural panel, comprising:
providing a phenolic honeycomb core;
providing first and second phenolic face layers on opposites sides of the honeycomb core; wherein one of said first and second phenolic face layers comprises a first fabric layer and a second fabric layer; impregnating said first and second fabric layers with a liquid phenolic adhesive by providing said liquid phenolic adhesive between said first and second fabric layers;
providing a liquid bonding medium for securing said first and second face layers to said honeycomb core;
assembling said phenolic honeycomb core and said first and second phenolic face layers in a vacuum bag;
sealing said vacuum bag;
drawing a vacuum inside said sealed vacuum bag; and
curing said core and face layers while under vacuum in said vacuum bag at a raised temperature.

13. The method according to claim 12, wherein said raised temperature comprises between 60-120 degrees Celsius.

14. The method according to claim 12, wherein said curing is performed for between for 1-8 hours.

15. The method according to claim 12, wherein said honeycomb core comprises an aramid based honeycomb.

16. The method according to claim 12, wherein said liquid bonding medium comprises a catalyzed liquid phenolic resin mixed with a pyrogenic oxide comprising fumed silica.

17. The method according to claim 2, wherein said further bonding medium comprises a phenolic adhesive.

18. The method according to claim 2, wherein said further bonding medium comprises a catalyzed liquid phenolic resin mixed with a pyrogenic oxide plus suitable additives.

19. The method according to claim 1, wherein at least one of said first or second fabric layers comprises an Aramid based fibre.

* * * * *